Jan. 5, 1932.   A. P. BUQUOR   1,840,155
MOTOR VEHICLE EQUALIZING AND SUSPENSION SYSTEM
Filed Nov. 21, 1930
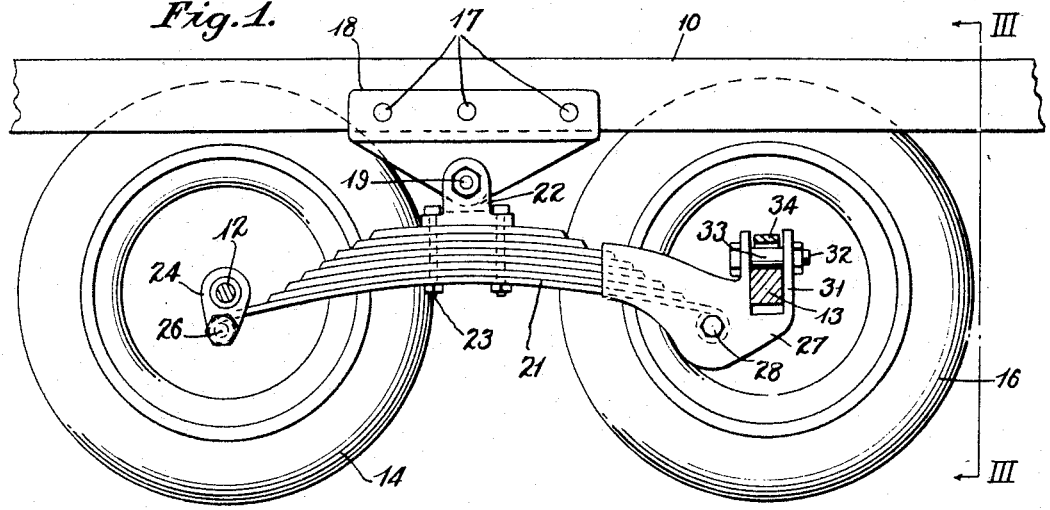
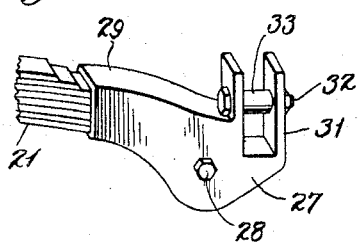
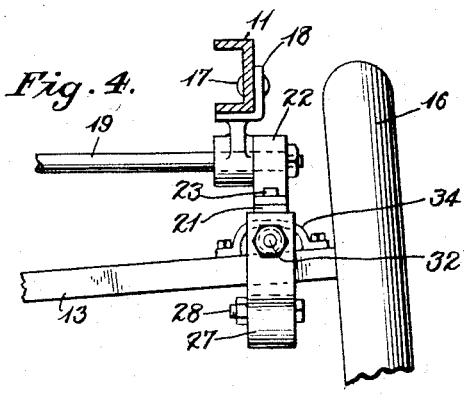
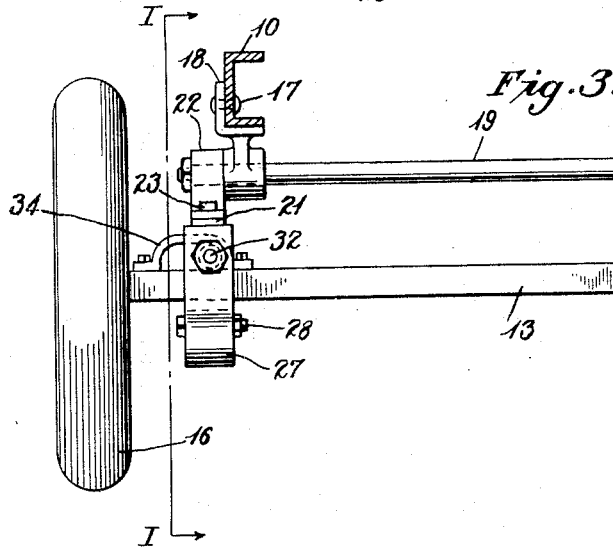
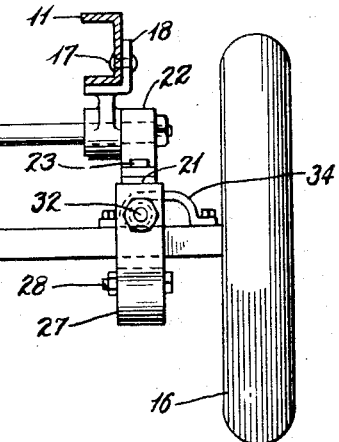
Inventor
A. P. Buquor
By Bacon & Thomas
Attorneys Patented Jan. 5, 1932

1,840,155

UNITED STATES PATENT OFFICE

ADOLPH P. BUQUOR, OF LOS ANGELES, CALIFORNIA, ASSIGNOR, BY DIRECT AND MESNE ASSIGNMENTS, TO MARTIN-PARRY CORPORATION, OF YORK, PENNSYLVANIA, A CORPORATION OF DELAWARE

MOTOR VEHICLE EQUALIZING AND SUSPENSION SYSTEM

Application filed November 21, 1930. Serial No. 497,285.

My invention relates to a load equalizing suspension system for tandem pairs of wheels of motor vehicles, and has for its object the provision of apparatus of the character designated which shall be simple and sturdy of design, economical of manufacture, and of extreme flexibility in operation.

A further object of my invention is to provide a load equalizing and suspension system of the character described which shall be particularly adapted for the addition of tandem wheels to ordinary four-wheel motor vehicles, and wherein relative angular movement of the wheel axles may occur without imposing a torsional strain on the members of the equalizing and suspension system.

A more specific object of my invention is to provide a means for adding tandem wheels to ordinary four-wheel motor vehicles, which shall include a load equalizing means effective to maintain proper linear spacing of the tandem wheels while permitting free relative angular movement of the wheel axles with a minimum of torsional strain on the equalizing members.

It has already been well established that the conversion of ordinary four-wheel motor vehicles to six-wheel vehicles by the addition of tandem wheels, greatly increases the load capacity of the vehicle without imposing concentrated loads upon the road. Difficulties have been encountered, however, in providing a sturdy flexible mechanism for mounting the additional wheels and for distributing the load between adjacent pairs of wheels. Such a mechanism, to meet the requirements of operation, must provide for proper linear spacing of the pairs of wheels; for free relative angular movement between adjacent axles to adapt the vehicle to uneven road surfaces; and for proper proportional load distribution to all the wheels under all conditions of service.

The above set forth requirements are fully met in my improved apparatus wherein a minimum of parts are employed with a maximum of strength and flexibility. In accordance with my invention, I provide an additional axle for the vehicle and mount a pair of additional wheels on said axle preferably to the rear of the original rear wheels of the vehicle. On the vehicle frame intermediate the two rear wheels on each side, I provide a bracket to which is pivotally attached a laminated leaf spring. The spring is connected to the original rear axle of the vehicle by a spring shackle and to the additional axle by an improved shoe and stirrup arrangement which permits angular movement of the axle about its short axis without imposing torsional strain upon the spring. The spring furthermore serves to preserve the proper linear spacing of the wheels, thereby minimizing side slippage and consequent tire wear.

Apparatus embodying features of my invention is illustrated in the accompanying drawings forming a part of this application in which:

Fig. 1 is a sectional view taken along the line 1—1 of Fig. 3;

Fig. 2 is a detail perspective view of the connector between the leaf spring and the additional axle;

Fig. 3 is a sectional elevation taken along the line 111—111 of Fig. 1; and

Fig. 4 is a detail sectional elevation showing the operation of my improved spring connector upon angular movement of the rear axle about its short axis.

Referring now to the drawings for a better understanding of my invention, I show a vehicle frame embodying side members 10 and 11. Mounted beneath the frame are parallel axles 12 and 13, the axle 12 being power driven. Mounted on the axles 12 and 13 are pairs of wheels 14 and 16, only one of the pair 14 being shown.

Rigidly secured to each of the frame members 10 and 11, as by means of rivets 17, are similar brackets 18 on each side of the vehicle. Pivotally secured to each of the brackets 18, as by means of a bolt 19 extending across the vehicle, is a laminated leaf spring 21 which is adapted to function as an equalizing lever for distributing the load between the pairs of wheels 14 and 16. As a preferred means of connecting the spring 21 to the bracket 18, I provide on the spring 21 a cooperating bracket 22 secured to the spring by means of bolts 23 and adapted to receive the ends of the bolt 19 which also passes through the bracket 18, as shown.

The forward end of the spring 21 is connected to the power driven axle 12 by means of an ordinary spring shackle 24 and a shackle bolt 26, the connection being of sufficient flexibility to permit the axle 12 to tilt, due to unevenness of the road. At the other end of the spring 21, I provide a shoe 27 through which a bolt 28 extends, and which secures the other end of the spring to the shoe. The upper part of the shoe 27 is made solid, as shown at 29, and is adapted to bear against the spring 28, and rigidly support the shoe in service. On the other end of the shoe 27 is provided a stirrup 31 which embraces the axle 13, as shown in Fig. 1 of the drawings. Through the upper end of the stirrup 31 is a bolt 32 which is also threaded through a roller 33 resting on the axle 13 and supporting its proportionate share of the weight of the vehicle frame and load.

Secured to the axle 13 over each of the rollers 33 is a U-shaped strap 34. As will be seen in Fig. 3, these straps are so disposed that with the wheels in a level position, the rollers 33 bear against the inner ends of the openings provided by the straps 34. The straps, therefore, limit the lateral movement of the wheels 16 with respect to the vehicle frame. Should one of the wheels 16 pass over an uneven portion of the road so as to cause the axle 13 to rotate about its short axis, as shown in Fig. 4, the roller 13 moves towards its outer position, and accordingly prevents any torsional strain to be communicated to the spring 21.

From the foregoing description, the operation of my improved apparatus will be apparent. Ordinarily, the power driven axle 12 is toward the front of the vehicle, permitting the lengthening of the vehicle frame along with increasing its load-carrying capacity. The spring 21 cushions the ordinary road shock and distributes the load proportionately to the pairs of wheels, this proportioning, of course, being predeterminedly fixed by the location of the pivot point of the spring with respect to the ends thereof. This system of equalizing the load also minimizes the shocks to the vehicle frame, in that when one of the wheels 14 or 16 passes over an inequality in the road surface, the vertical motion transmitted to the frame is only around half that of the wheel. The springs 21 being fixedly secured to the brackets 22, the brackets 18, and the shoes 27, also serve as a spacing means between the pairs of wheels 14 and 16, minimizing any side play of the wheels 16 and consequent unequal tire wear.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a suspension and load equalizing system for vehicles, a frame, tandem pairs of wheels for supporting the fame, axles for the wheels, at least one of which is power driven, a bracket secured to the frame on each side thereof intermediate adjacent wheels, a laminated leaf spring adapted to function as an equalizing lever pivotally connected intermediate its ends to each of the brackets, a shackle connecting one end of the spring to one of the axles, a shoe on the other end of the spring, a stirrup on the shoe embracing the other axle, and anti-friction means between the stirrup and said axle.

2. In a suspension and load equalizing system for vehicles, a frame, tandem pairs of wheels for supporting the frame, axles for the wheels, at least one of which is power driven, a bracket secured to the frame on each side thereof intermediate adjacent wheels, a laminated leaf spring adapted to function as an equalizing lever pivotally connected intermediate its ends to each of the brackets, a shackle connecting one end of the spring to one of the axles, a shoe on the other end of the spring, a stirrup on the shoe connecting it to the other axle, anti-friction roller means between the stirrup and its axle, and a strap on said other axle forming a lateral opening through which the roller means extends for limiting lateral movement of said axle with respect to the spring and permitting free oscillatory movement of said other axle about its short axis.

3. In a suspension and load equalizing system for motor vehicles, a pair of parallel wheel axles, at least one of which is power driven, a frame for the vehicle, a pair of laminated leaf springs pivotally connected on each side of the frame intermediate adjacent wheels, shackle means for connecting one end of each of the springs to one of the axles, a shoe at the other end of each of the springs, a stirrup on the shoe, roller means for connecting each of the stirrups to the other axle, and means for limiting lateral movement of the stirrups on said other axle.

In testimony whereof I affix my signature.

ADOLPH P. BUQUOR.